(12) United States Patent
Lanser

(10) Patent No.: US 7,946,658 B2
(45) Date of Patent: May 24, 2011

(54) WHEEL HUB, SYSTEM AND METHOD FOR RUT REDUCTION IN SELF PROPELLED IRRIGATION SYSTEMS

(75) Inventor: Jan Lanser, Lethbridge (CA)

(73) Assignee: RPH Irrigation Services Ltd., Calgary, Alberta (CA)

( * ) Notice: Subject to any disclaimer, the term of this patent is extended or adjusted under 35 U.S.C. 154(b) by 128 days.

(21) Appl. No.: 12/335,877

(22) Filed: Dec. 16, 2008

(65) Prior Publication Data

US 2010/0148570 A1    Jun. 17, 2010

(51) Int. Cl.
*B60B 23/00* (2006.01)

(52) U.S. Cl. ......... 301/111.04; 301/35.629; 280/86.753; 239/741

(58) Field of Classification Search ............. 301/35.629, 301/35.631, 111.01, 111.03, 111.04, 126–127, 301/131–132; 239/741–744, 748; 280/86.751, 280/86.753
See application file for complete search history.

(56) References Cited

U.S. PATENT DOCUMENTS

| | | | | |
|---|---|---|---|---|
| 1,810,154 A * | 6/1931 | Alig | ............................ | 440/12.66 |
| 1,826,325 A * | 10/1931 | Paul | .................................. | 74/60 |
| 2,241,098 A * | 5/1941 | Miller et al. | .................. | 404/132 |
| 2,314,601 A * | 3/1943 | Ritchie | .......................... | 404/125 |
| 3,407,531 A * | 10/1968 | Crawford | ....................... | 446/290 |
| 3,520,377 A * | 7/1970 | Wallace | .......................... | 180/7.1 |
| 3,583,639 A * | 6/1971 | Cornelius | ....................... | 239/745 |
| 3,999,569 A * | 12/1976 | Lindner et al. | ................. | 239/728 |
| 4,365,748 A * | 12/1982 | Emrich | .......................... | 239/728 |
| 5,088,662 A * | 2/1992 | Appleberry | .................... | 244/111 |
| 5,197,786 A * | 3/1993 | Eschenburg | ............... | 301/124.1 |
| 5,484,192 A * | 1/1996 | Degelman | ..................... | 301/131 |
| 5,813,687 A * | 9/1998 | Lay et al. | ................... | 280/414.1 |
| 6,237,863 B1 * | 5/2001 | Smith | ............................ | 239/722 |
| 6,374,665 B1 * | 4/2002 | Somppi et al. | ................... | 73/146 |
| 6,431,659 B1 * | 8/2002 | Somppi | .......................... | 301/132 |
| 7,021,431 B2 * | 4/2006 | Beattie | ........................... | 188/73.1 |
| 7,335,805 B2 * | 2/2008 | Iikubo et al. | ................... | 570/177 |

* cited by examiner

*Primary Examiner* — Jason R Bellinger
(74) *Attorney, Agent, or Firm* — Ade & Company Inc.; Kyle R. Satlerthwaite; Ryan W. Dupuis

(57) ABSTRACT

A self propelled irrigation system has a drive tower on which a drive wheel is mounted to a rotating member of a drive mechanism with an axis of the wheel obliquely angled relative to a drive axis of the rotating member such that the wheel is tilted out of a plane normal to the drive axis. A hub has its oppositely facing sides arranged to support the wheel in such an orientation, and may therefore be mounted between the drive mechanism and wheel of a conventional irrigation system in which the wheel and drive axes were previously coincident. The tilt of the wheel causes an intentional wobble under rotation of the hub so that the wheel's point of engagement with the ground wanders back and forth during repeated passage of the drive tower over a particular path, thereby reducing a rut forming or deepening tendency of the irrigation system.

20 Claims, 7 Drawing Sheets

WHEEL HUB, SYSTEM AND METHOD FOR RUT REDUCTION IN SELF PROPELLED IRRIGATION SYSTEMS

FIELD OF THE INVENTION

This invention relates generally to self propelled irrigation systems, and more particularly to a wheel hub, self propelled irrigation system and method for reducing rut forming and rut deepening tendencies in operation of such systems.

BACKGROUND OF THE INVENTION

Self-propelled irrigation systems use towers to support a water supply pipe above ground level at spaced positions along the pipe over a field to be irrigated. These towers feature driven wheels that propel the irrigation system over the field while water is discharged from the supply pipe at spaced locations therealong. Such systems include center pivot systems where the water supply pipe extends radially outward from a stationary center tower such that the drive towers move along concentric circular paths about the center tower and lateral or linear moving systems where drive towers at opposite ends of the pipe carry operate in a common direction to move it in a linear manner along the field. Conventionally an electric motor carried on each drive tower is connected a pair of drive wheels disposed on opposite sides of the water pipe through a respective pair of gearboxes.

A problem that occurs with conventional self propelled irrigation systems is that their drive towers follow the same path during repeated passes over the field, thereby often leading to the formation of deep wheel tracks or ruts. This can become especially problematic in the context of zero till or low till planting practices where the ground is not cultivated or tilled, and the ruts can accordingly grow excessively deep.

SUMMARY OF THE INVENTION

According to a first aspect of the invention there is provided a hub for mounting of a wheel to a drive mechanism installed on a drive tower of a self propelled irrigation system, the hub comprising a hub body having oppositely facing first and second sides, the first side being adapted for connection to the drive mechanism for driven rotation of the hub body thereby about a drive axis and the second side being adapted for connection to the wheel to support the wheel in an orientation where a central wheel axis of the wheel is obliquely angled relative to the drive axis.

Preferably the first side of the hub body has first clamping portions defining first seating surfaces for seating against the drive mechanism and the second side of the hub has second clamping portions defining second seating surfaces for seating against the wheel, the first clamping portion portions lying in a first plane and the second clamping portions lying in a second plane obliquely angled relative to the first plane.

Preferably the hub comprises a plurality of parallel wheel studs projecting from the second side of the hub body in a direction normal to the second plane thereof.

Preferably a plurality of axially parallel mounting holes are defined in the first clamping portions of the hub body.

Preferably the mounting holes are defined by axially parallel passages extending fully through the first and second sides of the hub body.

Preferably the hub body comprises first and second plates defining the first and second sides thereof and a central portion interconnecting the first and second plates.

Preferably the central portion comprises a ring-shaped band interconnecting the first and second plates along peripheries thereof.

Preferably the ring-shaped band projects normally from the first plate and tapers linearly in width in both directions about the ring-shaped band from a maximum width at one point around the ring-shaped band to a minimum width at a diametrically opposite point around the ring shaped band.

Preferably the second plate has an annular shape, a space defined between the first and second plates radially outward from a central opening defined in the second plate by the annular shape thereof is hollow and a plurality of mounting holes are defined in the first plate at positions opening into the hollow space.

Preferably the plurality of mounting holes in the first plate align with corresponding access holes in the second plate across the hollow space between the first and second plates.

Preferably a hollow space is defined between the first and second sides of the hub body radially outward from a central opening defined in the second side and the plurality of mounting holes in the first clamping portions of the hub body are situated at the hollow space.

Preferably the plurality of holes in the coplanar first clamping portions of the hub body align with corresponding access holes in the second side of the hub body across the hollow space between the first and second plates.

Preferably the hollow space is accessible through the central opening in the second side of the hub body.

According to a second aspect of the invention there is provided a self propelled irrigation system comprising a water supply pipe carried for movement upon at least one drive tower comprising two wheels mounted at a base of the tower support thereof, wherein at least one of the two wheels is mounted to a rotating member of a drive mechanism at the base of the drive tower with a wheel axis of the wheel obliquely angled relative to a rotational drive axis about which the rotating member is arranged to rotate under operation of the drive mechanism such that the wheel is tilted out of a plane normal to the rotational drive axis.

Preferably ground engaging portions of the wheel are equidistant from a point on the drive axis.

According to a third aspect of the invention there is provided a method of reducing a rut forming or rut deepening tendency of a self propelled irrigation system comprising a water supply pipe carried for movement upon at least one drive tower comprising two wheels mounted at a base of the tower support thereof, the method comprising removing a drive wheel of the drive tower from a drive mechanism thereof and reinstalling the drive wheel on the drive mechanism with a wheel axis of the wheel oriented at an oblique angle relative to a drive axis about which a drive member of the drive mechanism is arranged to rotate under operation of the drive mechanism.

Preferably the step of reinstalling the drive wheel comprises mounting a hub according to the first aspect of the invention between the drive mechanism and the wheel.

Preferably the mounting of the hub between the drive mechanism comprises bolting the hub to the drive mechanism using existing drive studs thereof and bolting the wheel to the hub through cooperation of wheel studs projecting from the second side of the hub with existing bolt holes of the wheel.

BRIEF DESCRIPTION OF THE DRAWINGS

In the accompanying drawings, which illustrate exemplary embodiments of the present invention.

DETAILED DESCRIPTION

Figure 4:
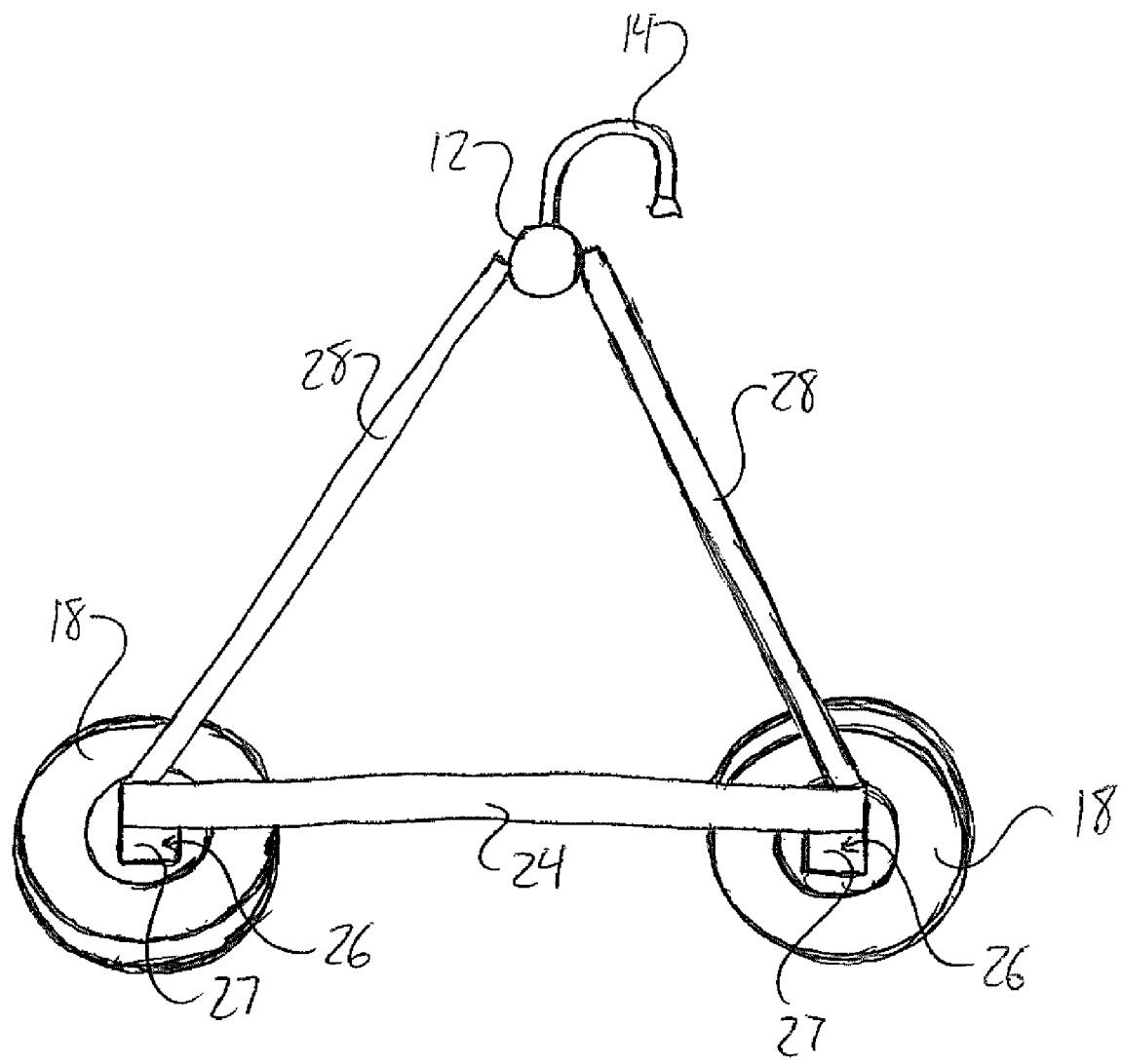
FIG. 4 is a schematic end elevational view of a single section of a self-propelled irrigation system featuring the wheel hub of FIG. 1.

FIG. 4 shows an end view of a section of a self propelled irrigation system 10 according to an embodiment of the present invention. In a conventional manner, the irrigation system features an upper boom 12 that is defined by a series of interconnected pipe sections sealed together end to end in a communicating manner to define a single water supply pipe. The pipe or boom 12 has a plurality of sprinklers 14 carried thereon and in communication with the interior thereof at spaced locations therealong for spraying discharge of water onto the field to be irrigated when water is fed through the pipe 12. The pipe 12 is supported above the ground at spaced locations along the pipe 12 by drive towers 16 each having a pair of drive wheels 18 installed at a bottom end of the tower 16 in cooperation with a drive system to propel the drive tower 16 along the ground and thus carry water supply pipe 12 of the movable irrigation system over the field to deliver water different areas of the field.

The irrigation system 10 differs from conventional self-propelled irrigation systems in that each wheel 18 is tilted out of a vertical plane normal to the horizontal drive axis of a gear box 20 to which the wheel is fixed. So, unlike a conventional self propelled irrigation system where a drive axis about which the gear box's output driven member rotates is coincident with the central axis of the wheel fixed to the gear box's output member so that the wheel revolves about the drive axis of the gear box, the wheel axis is intentionally misaligned with the drive axis so as to lie at an oblique angle thereto. This causes a wandering or wobbling effect of wheel under the driven rotation of the gear box output member to which the wheel is fixed, as the point of contact between the circumferential periphery of the wheel's tire and the ground moves laterally inward and outward toward and away from the drive tower 16 on which the gear box and connected wheel are mounted under driven rotation of the output member. In other words, this point of contact moves back and forth axially along the drive axis under such driven rotation. This is demonstrated by FIGS. 5 and 5A, where one wheel is marked with two diametrically opposite points A, B at its circumference, the other wheel is likewise marked with two diametrically opposite circumferential points A', B', and comparison of the drawings illustrates the movement experienced by each tire's point of contact with the ground during 180° of rotation around the drive axis 32 of the wheel.

In a center pivot irrigation system, the result of this wheel orientation is that while the drive tower 16 still follows a conventional circular path about the stationary center tower under operation of the drive mechanism, the actual point of engagement of each wheel 18 with the ground winds or weaves inward and outward along the circular path of the tower 16. This way, so long as the wheel does not engage the ground at the same point around its circumferential periphery at both the start and end of one complete revolution of the boom around the stationary center pivot tower, the path of the wheel's engagement with the ground around the center tower during the boom's second revolution will not match that of the first. As a result of the wheel not tracking along the same path, but rather weaving or wandering across the path followed or the track laid during the immediately preceding revolution of the boom, the depth of this track is not deepened in a rut-forming action experienced in conventional center pivot irrigation systems where the only motion of the wheel relative to the drive tower is rotational motion in a vertical plane fixed relative thereto such that the point of engagement between the wheel and the ground remains at a fixed radial distance from the center tower and therefore rolls over the same circular path thereabout with every revolution of the boom.

Figure 1:
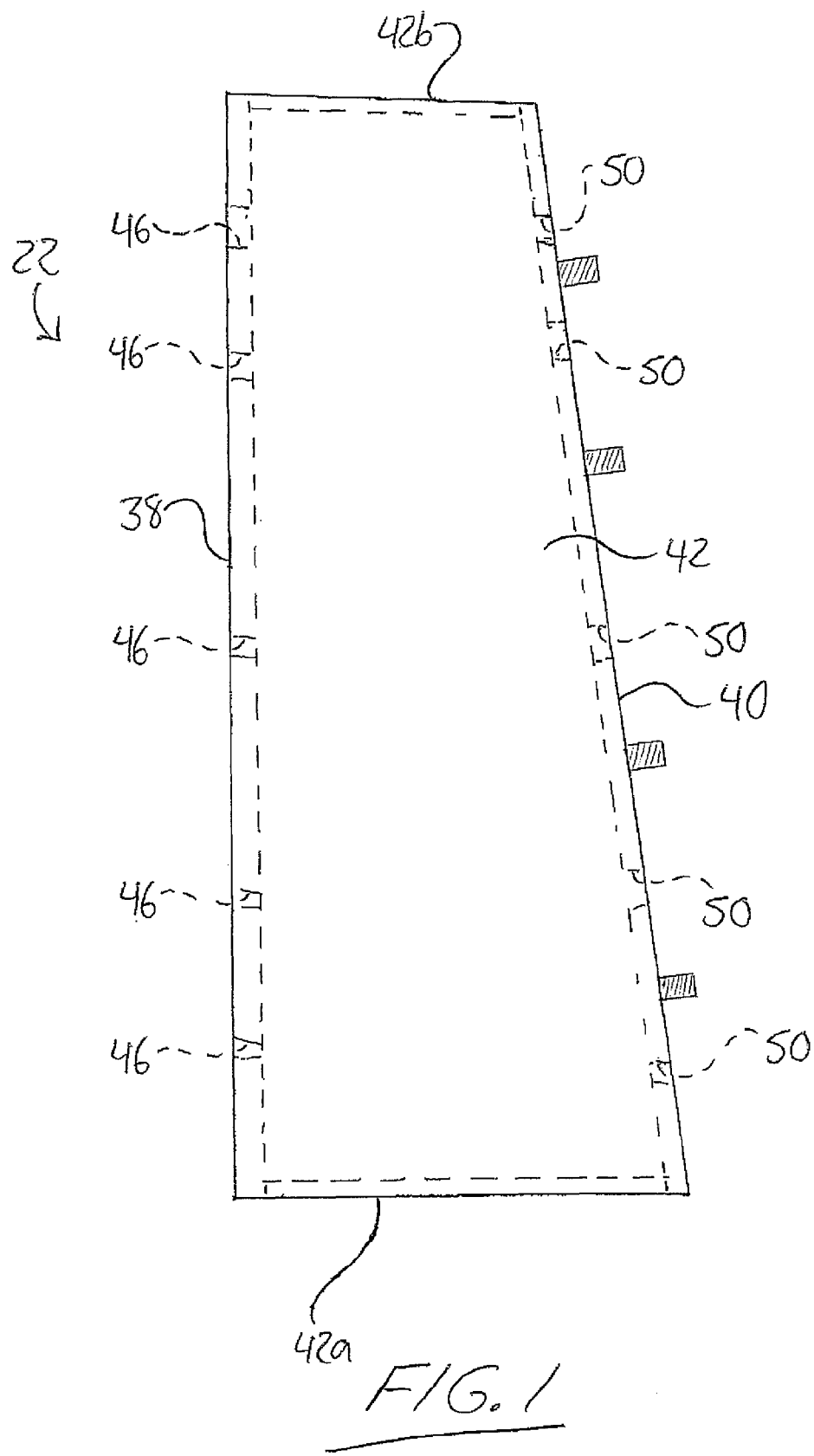
FIG. 1 is a schematic side elevational view of a wheel hub according to an embodiment of the present invention.
Figure 2:
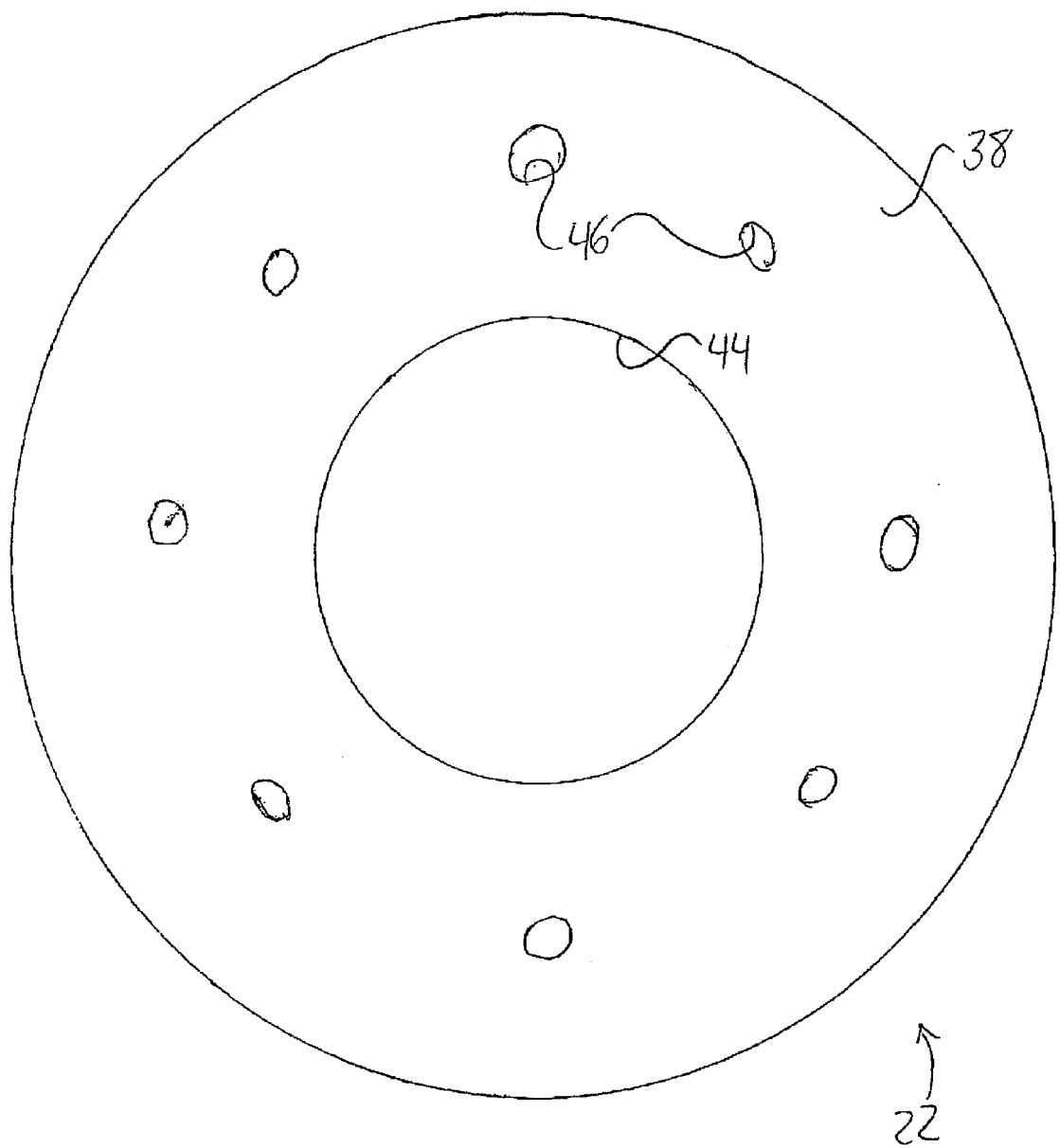
FIG. 2 is a schematic rear elevational view of the wheel hub of FIG. 1.
Figure 3:
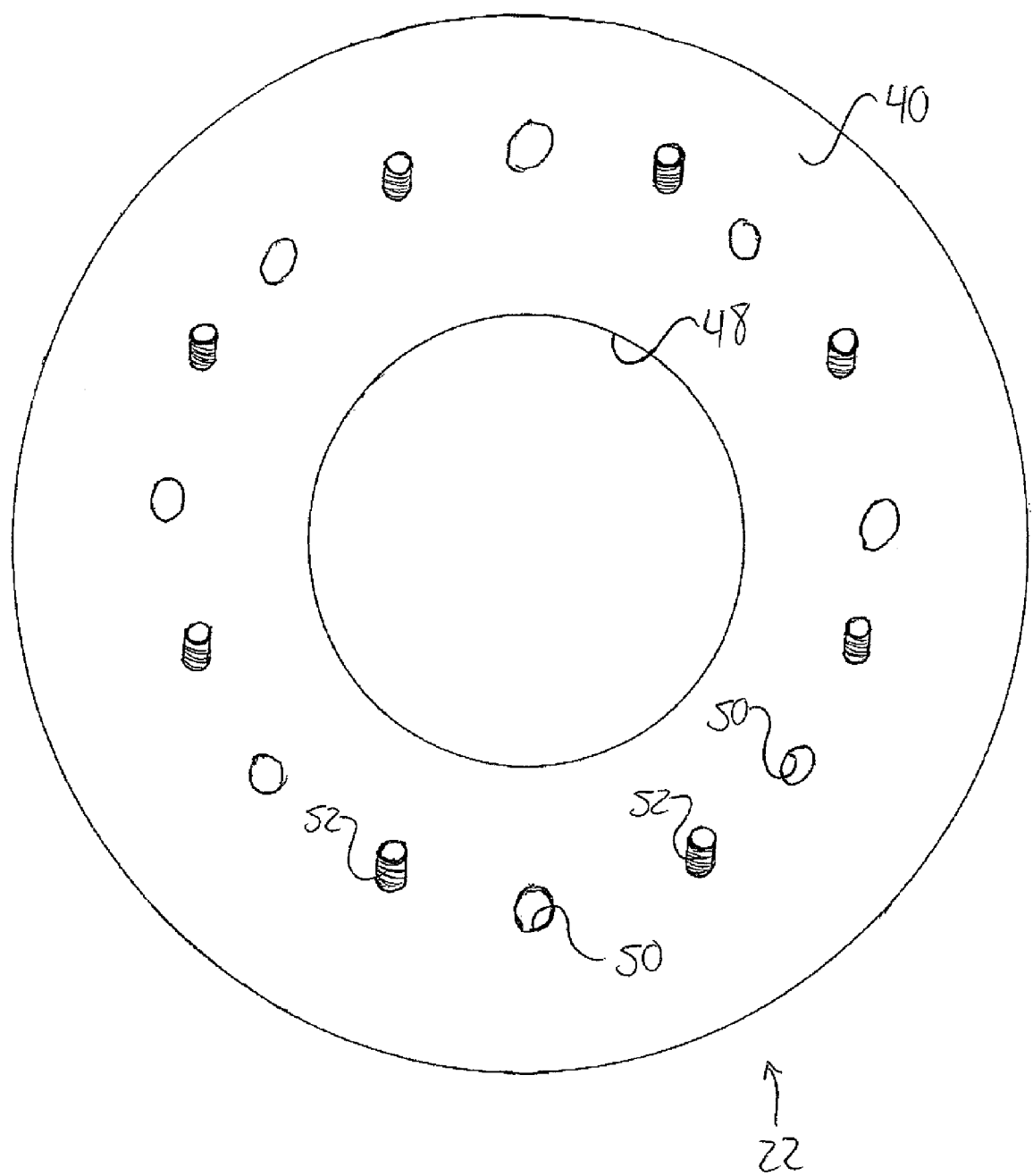
FIG. 3 is a schematic front elevational view of the wheel hub of FIG. 1.

The tilted wheel orientation of the irrigation system 10 is provided by a wheel hub 22 illustrated in isolation in FIGS. 1 to 3.

Figure 5:
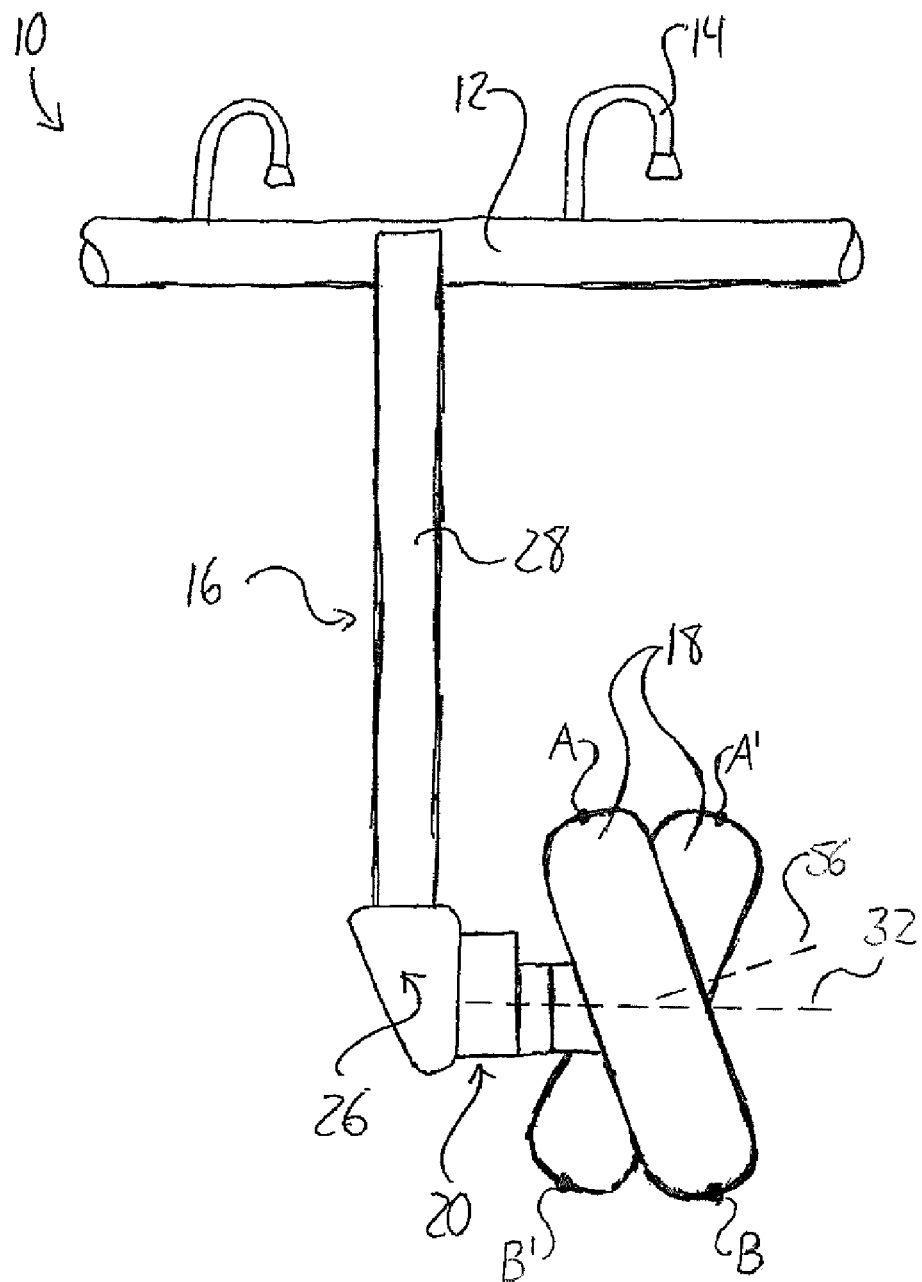
FIG. 5 is a schematic side elevational view of the self-propelled irrigation system featuring the wheel hub of FIG. 1.
Figure 5A:
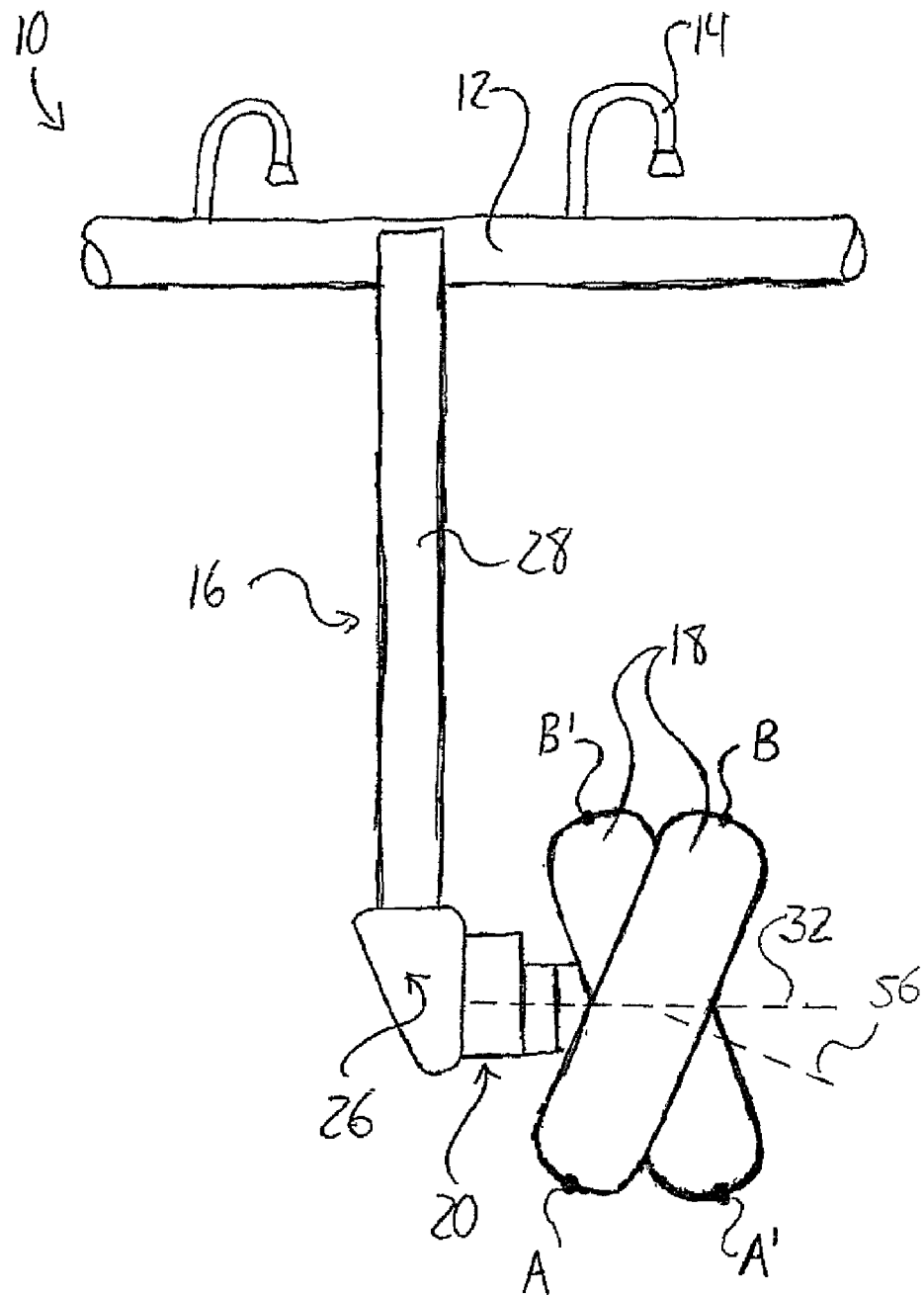
FIG. 5A shows the self-propelled irrigation system of FIG. 5 from same viewing angle relative thereto after having traveled a distance corresponding to half a wheel rotation.
Figure 6:
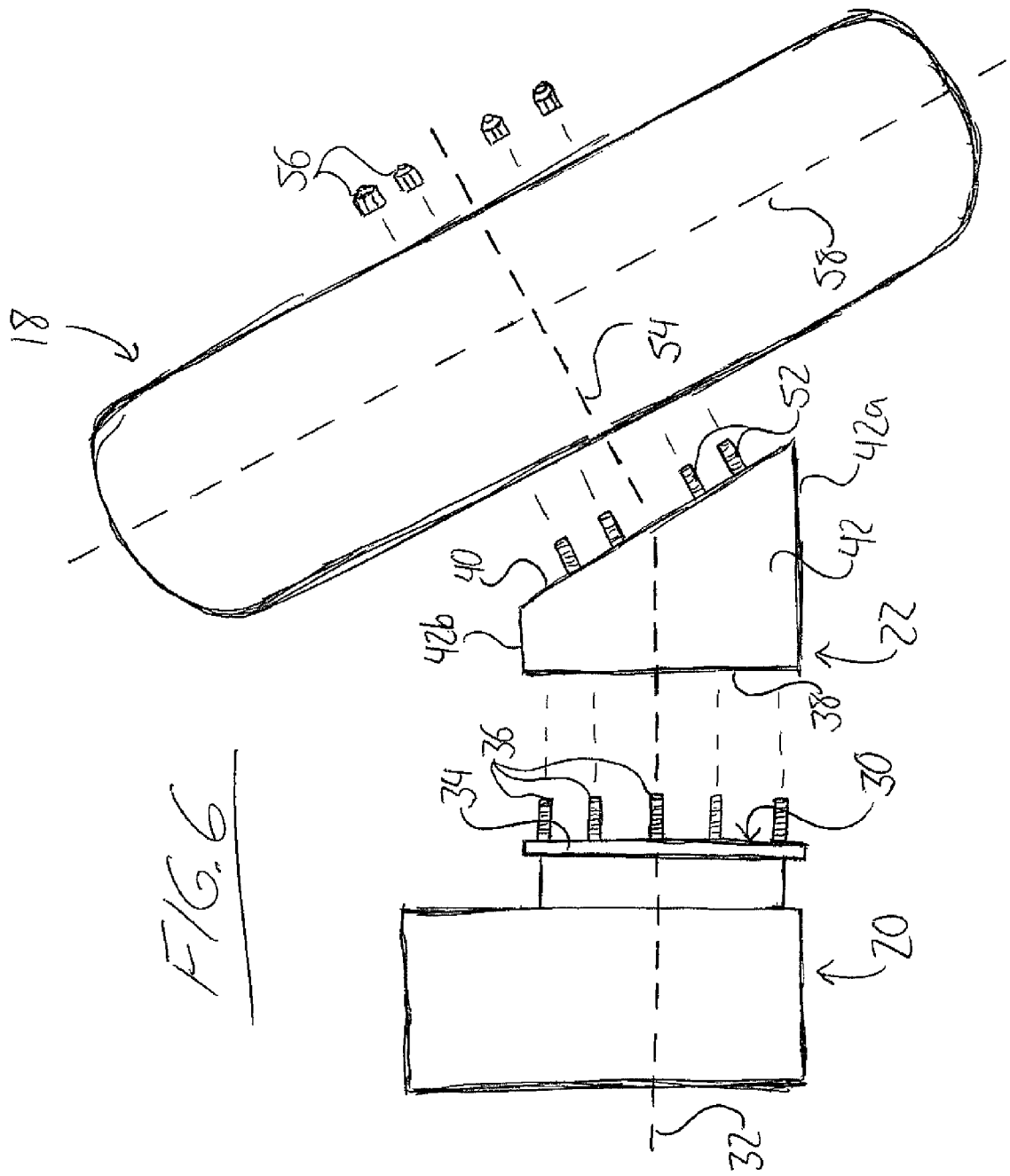
FIG. 6 is a schematic exploded side elevational of a drive wheel and gear box of the self propelled irrigation system illustrating the connection thereof by the wheel hub of FIG. 1.

With reference to FIGS. 4 to 6, the illustrated irrigation system has two gear boxes 20 mounted at opposite ends of a base tube or beam 24 of the drive tower 16 in a conventional manner, for example using mounting brackets 26 fixed to the base tube 24 proximate the opposite ends thereof to present a mounting plate 26 facing laterally outward from the base tube 24 perpendicularly traversing the boom 12 supported thereabove by a pair of tower legs 28 projecting convergingly upward from proximate the opposite ends of the base tube 24. Each gear box 20 is bolted to the mounting plate 27 and the two gear boxes so supported on a common side of the drive tower are operated by an electric motor carried thereon (not shown) in a conventional manner to form a drive system of the drive tower 16. Again in a conventional manner, the gear box 20 has an output member 30 driven for rotation about a drive axis 32 passing centrally therethrough and presenting an annular mounting flange or face 34 facing away from the drive tower 16 parallel to the mounting plate 27 on a side thereof opposite the rest of the drive tower. The annular mounting flange of the gearbox's output member 30 closes around the drive axis passing centrally therethrough and features parallel bolts or studs 36 projecting normally from the mounting flange away from the drive tower 16. In a conventional self-propelled irrigation system, these studs 36 are used to bolt the wheel 18 directly to the mounting flange 34 of the gearbox's output member to situate the wheel in a vertical plane normal to the drive axis 32 for driven rotating of the wheel 18 about the drive axis 32 under operation of the driving system.

In the irrigation system of the present invention however, the mounting studs 36 of the gearbox 20 are instead use to mount the novel wheel hub 22, which in turn is arranged to support the wheel 18 in the above described tilted orientation. With reference to FIG. 1, the hub 22 has a flat rear plate 38 and a flat front plate 40 spaced apart from one another by a ring-shaped band 42 positioned therebetween. The band 42 has a rear edge face thereof situated against the face of the rear plate 38 facing the front plate 40 and extending fully along the circumference or perimeter of the rear plate 40, which is circular in shape. The band 42 projects normally from this face of the rear plate to support the front plate 40 at the opposite front edge face of the band 42. The band tapers from a widest point 42a about its periphery to a diametrically opposite narrowest point 42 about the band's circular shape so that the front plate 40 fixed to the band 42 at the front edge face thereof is obliquely sloped in one direction relative to the vertically oriented rear plate 38, converging theretoward from the widest point 42a along the band to the narrowest point 42b along the band. The front edge face of the band 42 extends along the perimeter of the front plate 40, but is not normal thereto due to the band's tapering shape and the resulting slope slope or tilt of the front plate 40 relative to the rear plate 38. The front plate 40 is obliquely sloped toward the rear plate 38 along only one of the rear plate's two planar dimensions. In other words, the front plate 40 is tilted out of an orientation parallel to the rear plate 38 about only a single linear axis parallel to the plane of the rear plate 38.

As shown in FIG. 2, the rear plate 38 is annular, having a circular central opening 44 therethrough. Outward from the central opening 44, a plurality of mounting holes 46 extend through the rear plate 38 at a common radial distance from the center of the circular rear plate 38 and are angularly spaced equally about the center of the rear plate 38. The positioning, number and spacing between the mounting holes 46 is determined by and matches the bolt circle and bolt pattern of the mounting studs 36 so that the hub 22 is installed on the drive system of the drive tower 16 by axially aligning the gearbox mounting studs 36 with the hub mounting holes 46 and linearly bringing the rear plate 38 of the hub into face-to-place placement against the mounting flange 34 of the gearbox output member 30. The space between the front and rear plates 38, 40 of the hub 22 and enclosed by the ring-shaped band 42 spanning widthwise therebetween is left entirely hollow.

With reference to FIG. 3, the front plate 40 has a circular central opening 48 therein that is axially aligned with the central opening 44 in the rear plate, the hollow interior space of the hub being accessible through the front plate's central opening 48. This way, once the hub 22 has been placed over the mounting studs 36 against the mounting flange 34, the installer can reach through the central opening in the front plate 40 to manually reach the mounting studs 36 passing through the mounting holes 46 radially outward from the central openings 44, 48 in the two plates 38, 40 to thread lug nuts onto the free ends of the mounting studs 36. For tightening of the lug nuts to clamp the rear plate 38 of the hub 22 against the mounting flange 34 of the gearbox 20, access holes 50 passing through the front plate 40 of the hub 22 each axially align with a respective one of the mounting holes 46 in the rear plate 40 across the hollow space between the plates and are each sized to receive the driving end of a conventional lug-nut tool. This way, the driving end of the tool can reach the lug nut threaded of each mounting stud 36 via the respective access hole 50 and the hollow interior of the hub to tighten and loosen the lug nut during installation and removal of the hub. These access holes are provided in case the tool manipulation necessary to sufficiently tighten the lug nut to firmly and safely clamp the hub to the gearbox is not possible by accessing the lug nut through the central opening in the front plate, or is not achievable with a reasonable degree of ease or comfort. As the mounting holes are smaller than the lug nuts so that the lug nuts clamp against the rear plate 38 under tightening on the drive studs 36 and the drive end of the lug nut tool is large enough to fit over the lug nut, the access holes 50 are accordingly larger than the mounting holes in order to accommodate the working end of the tool. The holes need not necessarily be circular, and each access hole and respective mounting hole need not necessarily be centered on the same axis, but should generally align so as to at least overlap with one another when viewed along the axis of the respective drive stud by an amount sufficient to accommodate the tool's working end cross section.

With reference to FIGS. 1, 3 and 6, the front plate 40 of the hub features wheel studs 52 projecting normally therefrom in an outward direction away from the rest of the hub 22. The wheel studs project from the front plate 40 at positions between the access holes 50, the positioning, number and spacing of the wheel studs 52 matching and being determined by the number and spacing of bolt holes provided in the conventionally structured drive tower wheel 18. These bolt holes passing through a planar face of the central body of the wheel are axially parallel to the central axis 54 thereof and are used to install the wheel 18 against the outer hub 22 in the same way they would be used to install the wheel 18 against the gearbox mounting flange 34 in a conventional irrigation system. The installation is carried out by positioning the wheel to axially align the hub's wheel studs 52 with the bolt holes in the wheel 18 and linearly bringing the planar face of the wheel's central body into face-to-place placement against the face of the hub's front plate 40 from which the wheel studs 52 project. With the wheel 18 so fitted over the wheel studs 52 of the hub 22, lug nuts 56 exceeding the diameter of the bolt holes are threaded onto the free ends of the wheel studs from the side of the wheel body opposite the hub 22 and tightened to clamp the flat face of the wheel body against the outward face of the hub's front plate 40.

With reference to FIG. 6, the mounting studs 36 of the conventional gearbox are centered around the drive axis 32 thereof and so the installed hub 22 accordingly has its mounting holes in the rear plate 38 also centered around the drive axis 32. Under operation of the drive mechanism, the hub 22 thus rotates coaxially with the output member 30 of the gearbox 20 about the drive axis 32. With the wheel 18 installed on the hub 22, the central wheel axis 54 normal to the flat mounting face of the wheel body, and accordingly normal to the front plate 40 of the hub on which the wheel is installed, lies in a common plane with the drive axis 32 and obliquely intersects therewith at the plane of the face-to-face mating of the front plate 40 of the hub 22 and the mounting face of the wheel body. In the illustrated embodiment, the wheel 18 is a zero offset wheel having a tire that is symmetric about a central plane 58 of the wheel, with a planar mounting face of the wheel body lying in the central plane 58 so that the wheel body is seated against the front plate 40 of the hub, and the wheel axis 54 and drive axis 32 accordingly intersect, at the central plane of the wheel 18. In this arrangement, because the portions of the tire's circumferential periphery that engage the ground during rotation of the hub and wheel assembly are equidistant from the intersection point of the drive and wheel axes, a vertical distance measured perpendicularly from the horizontal drive axis 32 down to where the wheel 18 engages the ground remains constant during driven rotation of the hub and wheel assembly about the drive axis 32 so that the wheel is not tending to lift and lower the respective end base tube 24 relative to the ground over which the wheel is moving during operation of the drive mechanism.

The angle at which the front plate 40 is tilted or sloped to converge toward the vertical rear plate 38, and the equal angle at which the wheel axis is accordingly sloped relative to the drive axis, may vary, and for example may range from two to thirty degrees, but preferably is between three and fifteen degrees. Hubs of different dimensions may be produced for different sizes of wheels. For example, hubs produced to each have the same overall width defined at the widest portion of the ring-shaped band in the illustrated embodiment may be produced with different angles or slopes between the front and rear plates based on different wheel sizes for which they are intended for use. In such instance, larger diameter wheels would be used with hubs of a smaller angle between the front and wheel plates to avoid contact of the wheel with the gear box drive shaft or other component of the drive tower, as the distance by which a point on the wheel periphery moves laterally back and forth toward and away from the drive tower under rotation of the hub increases with tire size at a fixed angle or increases with the angle at a fixed tire size. Alternatively, hubs can be produced with a constant angle or slope between the front and rear plates, but with varying widths therebetween, as determined by the greatest width of the tapered band between the plates of a hub of the illustrated embodiment, with the width of each hub being sufficient to prevent contact between a wheel of a size for which the particular hub is intended for use and components of the drive tower on which the hub is intended for use.

In the illustrated embodiment detailed herein above, the rear and front plates 38, 40 of the hub 20 define planar members that are each clamped a respective one of the mounting flange of the gearbox output shaft and a disc of the wheel at spaced apart portions of the plate by the cooperation of stud bolts and lug nuts at seating surfaces surrounding the holes at these portions of the plate. It will be appreciated however that coplanar clamping portions presenting seating surfaces shaped and positioned to seat against the face of the gearbox mounting flange and wheel body may be defined at the rear and front sides of the hub by members of shape or structure other than an entirely planar plate member. Although it may be possible to thread lug nuts onto the mounting studs 36 of the gearbox 20 through the access holes 50 in the front side of the hub 22 using the working end of a lug nut tool rather than manually threading the lug nuts on through the central opening 48 in the front side of the hub 22, the central opening allows easy retrieval of a lug nut should it fall from the tool into the hollow interior of the hub 22. While such nut loss may alternatively be prevented by enclosing a passage from each access hole 50 to the respective mounting hole 46, for example by mounting a tubular member in axial alignment with these holes between the front and rear plates 38, 40 before installing the ring-shaped band thereabout or by producing the hub as a solid body with bores passing therethrough to define these holes, the plate and band construction defining the hollow interior and including the central openings in the plates offers a simplified production and reduced weight relative to such alternatives. Alternatively, if the hub and the front opening therein are sufficiently large to accommodate a lug nut tool for tightening manipulation of the lug nuts on the mounting studs, then the hub 22 may be produced without the access holes 50 in the front side thereof.

The hub 22 described herein above may be sold for installation on an existing self-propelled irrigation system, in which case the bolt circle, bolt pattern and hole size of the mounting holes 46 in the rear side of the hub and the bolt circle, bolt pattern and bolt size of the wheel studs on the front side of the hub are selected to correspond to the bolt circle, bolt pattern and hole and stud size of the existing gearbox output member and existing drive wheel of the irrigation system. This way, the hub can be installed by removing the previously installed wheel and mounting the hub 22 to the existing gearbox of the irrigation system's drive tower, and then mounting the so-removed wheel onto the hub 22, without requiring any modification to the existing gearbox and wheel. Such a hub intended for use with a particular model of self-propelled irrigation system may be sold with a set of lug nuts of suitable size, type and number to mate with the mounting studs of the existing system's gearbox. This product could be sold in pairs, the end consumer thus purchasing a number of two-hub kits based on the number of drive towers in the system they are purchased for.

Alternatively, new irrigation systems including the described tilted wheel configuration may be manufactured and sold. In such cases, each wheel hub 22 may be attached to the drive mechanism by means other than the stud and nut bolting arrangement described for the illustrated embodiment. However, the use of such releasable fastening arrangements facilitates easy disassembly of the hub from the drive train, for example for replacement, repair or servicing of the gearbox As with conventional self-propelled irrigation systems, the number and length of boom sections and the corresponding number of support and drive towers may be varied as desired.

Although described above in the context of a center pivot irrigation system, the tilted wheel configuration of the present invention may also be applied to lateral or linear moving irrigations systems of the type that span less than the full width of a field and make multiple passes therealong to irrigate the full field. Such systems feature one or more boom sections carried between two drive towers at opposite ends of the boom, typically with an additional one or more drive towers between the two end drive towers if the system features multiple sections. To make a first pass along the field, the drive towers are driven in a common direction along a linear path perpendicular to the boom. At the end of this first pass, the drive towers are controlled to swing one end of the boom 180° about the other so that the drive towers can then once be driven in a common direction opposite that of the first pass to make a second parallel pass adjacent the first. The tilted wheel configuration of the present invention can be used to prevent the wheels from following the same path in subsequent multiple-pass irrigation of the same field. It may also be possible to use the titled wheel configuration in a single pass lateral moving irrigation system spanning a full width of a field, but would require rotation of each hub and drive wheel by an amount other than 360° about the respective drive axis between passes of the system in opposite directions over the field to ensure that the wheel does not follow the same wandering path it just traversed when the drive direction of the system is reversed from one pass to the next. In such swing around or full-width linear irrigation systems, the point of engagement of each wheel with the ground would follow a weaving path wandering back and forth toward and away from the linear path followed by the overall drive tower.

It will be appreciated that an irrigation system featuring the tilted wheel configuration of the present invention could use a single gearbox driven by a single driveshaft from the motor such that only one of two wheels defines a drive wheel, the other providing a non-propelled support wheel that is carried in a non-vertical tilted plane on a hub that is of the type described above but is mounted on a non-driven rotatable member, not a gearbox of the drive train.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. In combination, a hub, a wheel, and a drive mechanism of a self propelled irrigation system, the drive mechanism being configured to drive rotation of an output member thereof around a drive axis and the hub comprising a hub body having oppositely facing first and second sides, the first side of the hub body being fixed to the output member of the drive mechanism for driven rotation of the hub body thereby about the drive axis and the second side of the hub body having the wheel supported thereon in an orientation where a central wheel axis of the wheel is at an oblique angle relative to the drive axis, whereby the hub and the drive mechanism are arranged to shift a point of engagement between the ground and the wheel back and forth axially along the drive axis under driven rotation of the hub due to the oblique angle between the drive axis and the central wheel axis, wherein the first side of the hub body has first clamping portions defining first seating surfaces seating against the output member of the drive mechanism and the second side of the hub body has second clamping portions defining second seating surfaces seating against the wheel, the first clamping portion portions lying in a first plane and the second clamping portions lying in a second plane obliquely angled relative to the first plane.

2. The combination according to claim 1 wherein the hub comprises a plurality of parallel wheel studs projecting from the second side of the hub body in a direction normal to the second plane thereof.

3. The combination according to claim 1 wherein a plurality of axially parallel mounting holes are defined in the first clamping portions of the hub body.

4. The combination according to claim 3 wherein the mounting holes are defined by axially parallel passages extending fully through the first and second sides of the hub body.

5. The combination according to claim 1 wherein the hub body comprises first and second plates defining the first and second sides thereof and a central portion interconnecting the first and second plates.

6. The combination according to claim 5 wherein the central portion comprises a ring shaped band interconnecting the first and second plates along peripheries thereof.

7. The combination according to claim 6 wherein the ring-shaped band projects normally from the first plate and tapers in width about the ring-shaped band from a maximum width at one point around the ring-shaped band to a minimum width at a diametrically opposite point around the ring shaped band.

8. The combination according to claim 5 wherein the second plate has an annular shape, a space defined between the first and second plates radially outward from a central opening defined in the second plate by the annular shape thereof is hollow and a plurality of mounting holes are defined in the first plate at positions opening into the hollow space.

9. The combination according to claim 8 wherein the plurality of mounting holes in the first plate align with corresponding access holes in the second plate across the hollow space between the first and second plates.

10. The combination according to claim 3 wherein a hollow space is defined between the first and second sides of the hub body radially outward from a central opening defined in the second side and the plurality of mounting holes in the first clamping portions of the hub body open into the hollow space.

11. The combination according to claim 10 wherein the plurality of holes in the first clamping portions of the hub body align with corresponding access holes in the second side of the hub body across the hollow space between the first and second plates.

12. The combination according to claim 10 wherein the hollow space is accessible through the central opening in the second side of the hub body.

13. A method of reducing a rut forming or rut deepening tendency of a self propelled irrigation system comprising a water supply pipe carried for movement upon at least one drive tower comprising two wheels mounted at a base of the tower support thereof, the method comprising:

removing a drive wheel of the drive tower from a drive mechanism thereof;

reinstalling the drive wheel on the drive mechanism with a wheel axis of the drive wheel oriented at an oblique angle relative to a drive axis about which an output member of the drive mechanism is arranged to rotate under operation of the drive mechanism; and operating the drive mechanism to drive rotation of the drive wheel and shift a point of engagement between the ground and the wheel back and forth axially along the drive axis under said rotation due to the oblique angle between the drive axis and the wheel axis;

wherein the step of reinstalling the drive wheel comprises mounting a hub between the drive mechanism and the drive wheel, the hub comprising a hub body having oppositely facing first and second sides, the mounting of the hub between the drive mechanism and the drive wheel comprising connecting the first side of the hub body to the output member of the drive mechanism for rotation of the hub body about the drive axis under operation of the drive mechanism and connecting the second side of the hub body to the drive wheel to support the drive wheel in an orientation where the wheel axis is situated at the oblique angle relative to the drive axis.

14. The method according to claim 13 wherein the first side of the hub body has first clamping portions defining first seating surfaces for seating against the drive mechanism and the second side of the hub has second clamping portions defining second seating surfaces for clamping against the drive wheel, the first clamping portion portions lying in a first plane and the second clamping portions lying in a second plane obliquely angled relative to the first plane.

15. The method according to claim 13 wherein the mounting of the hub between the drive mechanism and the drive wheel comprises bolting the hub to the drive mechanism using existing drive studs thereof and bolting the drive wheel to the hub through cooperation of wheel studs projecting from the second side of the hub with existing bolt holes of the wheel.

16. In combination, a hub, a wheel, and a drive mechanism of a self propelled irrigation system, the drive mechanism being configured to drive rotation of an output member thereof around a drive axis and the hub comprising a hub body having oppositely facing first and second sides, the first side of the hub body being fixed to the output member of the drive mechanism for driven rotation of the hub body thereby about the drive axis and the second side of the hub body having the wheel supported thereon in an orientation where a central wheel axis of the wheel is at an oblique angle relative to the drive axis, whereby the hub and the drive mechanism are arranged to shift a point of engagement between the ground and the wheel back and forth axially along the drive axis under driven rotation of the hub due to the oblique angle between the drive axis and the central wheel axis, wherein the hub body comprises first and second plates defining the first and second sides thereof and a central portion interconnecting the first and second plates.

17. The combination according to claim 16 wherein the central portion comprises a ring shaped band interconnecting the first and second plates along peripheries thereof.

18. The combination according to claim 17 wherein the ring-shaped band projects normally from the first plate and tapers in width about the ring-shaped band from a maximum width at one point around the ring-shaped band to a minimum width at a diametrically opposite point around the ring shaped band.

19. The combination according to claim 16 wherein the second plate has an annular shape, a space defined between the first and second plates radially outward from a central opening defined in the second plate by the annular shape thereof is hollow and a plurality of mounting holes are defined in the first plate at positions opening into the hollow space.

20. The combination according to claim 19 wherein the plurality of mounting holes in the first plate align with corresponding access holes in the second plate across the hollow space between the first and second plates.

* * * * *